United States Patent
Sarfati et al.

(10) Patent No.: US 12,283,291 B1
(45) Date of Patent: Apr. 22, 2025

(54) FACTUALLY CONSISTENT GENERATIVE NARRATIONS

(71) Applicant: Amazon Technologies, Inc., Seattle, WA (US)

(72) Inventors: Noah Lirone Sarfati, Tel Aviv (IL); Ido Yerushalmy, Tel Aviv (IL); Michael Chertok, Raanana (IL); Ianir Ideses, Raanana (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/450,695

(22) Filed: Aug. 16, 2023

(51) Int. Cl.
| | | |
|---|---|---|
| *G11B 27/036* | (2006.01) | |
| *G10L 15/26* | (2006.01) | |
| *H04N 21/81* | (2011.01) | |
| *H04N 21/8549* | (2011.01) | |

(52) U.S. Cl.
CPC ............ *G11B 27/036* (2013.01); *G10L 15/26* (2013.01); *H04N 21/8106* (2013.01); *H04N 21/8549* (2013.01)

(58) Field of Classification Search
CPC .. G11B 27/036; G10L 15/26; H04N 21/8106; H04N 21/8549
See application file for complete search history.

(56) References Cited

U.S. PATENT DOCUMENTS

| | | | |
|---|---|---|---|
| 11,714,595 B1 * | 8/2023 | Libin | H04N 7/15 704/235 |
| 2018/0359530 A1 * | 12/2018 | Marlow | G11B 27/031 |
| 2020/0066251 A1 * | 2/2020 | Kumano | G10L 13/10 |
| 2021/0165973 A1 * | 6/2021 | Kofman | G06F 40/30 |
| 2024/0212715 A1 * | 6/2024 | Yee | G11B 27/34 |

* cited by examiner

*Primary Examiner* — Thai Q Tran
*Assistant Examiner* — Jose M Mesa
(74) *Attorney, Agent, or Firm* — Eversheds Sutherland (US) LLP

(57) ABSTRACT

Systems, devices, and methods are provided for determining factually consistent generative narrations. A narrative may be generated by performing steps to determine one or more metadata messages for a first portion of a video stream, determine transcribed commentary for a second portion of the video stream, wherein the second portion includes the first portion, and determine a prompt based at least in part on the one or more metadata messages and the transcribed commentary. The prompt may be provided to a generative model that produces an output text. Techniques for performing a factual consistency evaluation may be used to determine a consistency score for the output text that indicates whether the output text is factually consistent with the one or more metadata messages and the transcribed commentary. A narrated highlight video may be generated using the consistent narrative.

20 Claims, 8 Drawing Sheets

FACTUALLY CONSISTENT GENERATIVE NARRATIONS

BACKGROUND

Video highlights of events, such as sporting matches, have become an important form of media for viewers, offering a condensed and engaging way to relive or catch up on the most important moments of an event. These highlights serve as a powerful tool for content providers and offer a convenient and accessible means for viewers to consume content in a more abbreviated format that captures the most important portions of the event. However, creating these highlights at scale presents numerous challenges.

One major challenge in generating highlights is the vast amount of raw footage that needs to be processed. For large scale content providers, there can be hundreds of concurrent sporting events and it can be infeasible to spend several hours sifting through all that footage to identify and compile the key moments, which requires significant time and effort. Furthermore, the demand for timely highlights necessitates a quick turnaround, making it impractical to rely on manual processes to generate highlights at scale.

In addition to the practical challenges involved in generating highlight narrations at scale, traditional forms of presenting sports highlights also have limitations. Manual processes that involve professional narrators developing their own narratives and commentators reading them during a highlight clip are time-consuming, expensive to produce, and cannot be done in real-time. For example, while a sporting event is being broadcasted, a highlight video may be a convenient means for a viewer tuning in during the middle of a sporting event to catch up to the action with quick highlights of all the critical events that previously occurred. To keep new viewers up-to-date on the action, a new version of the highlight video for the event may be generated every few minutes, making it infeasible and impractical to use human narration to produce the highlight videos.

Figure 1:
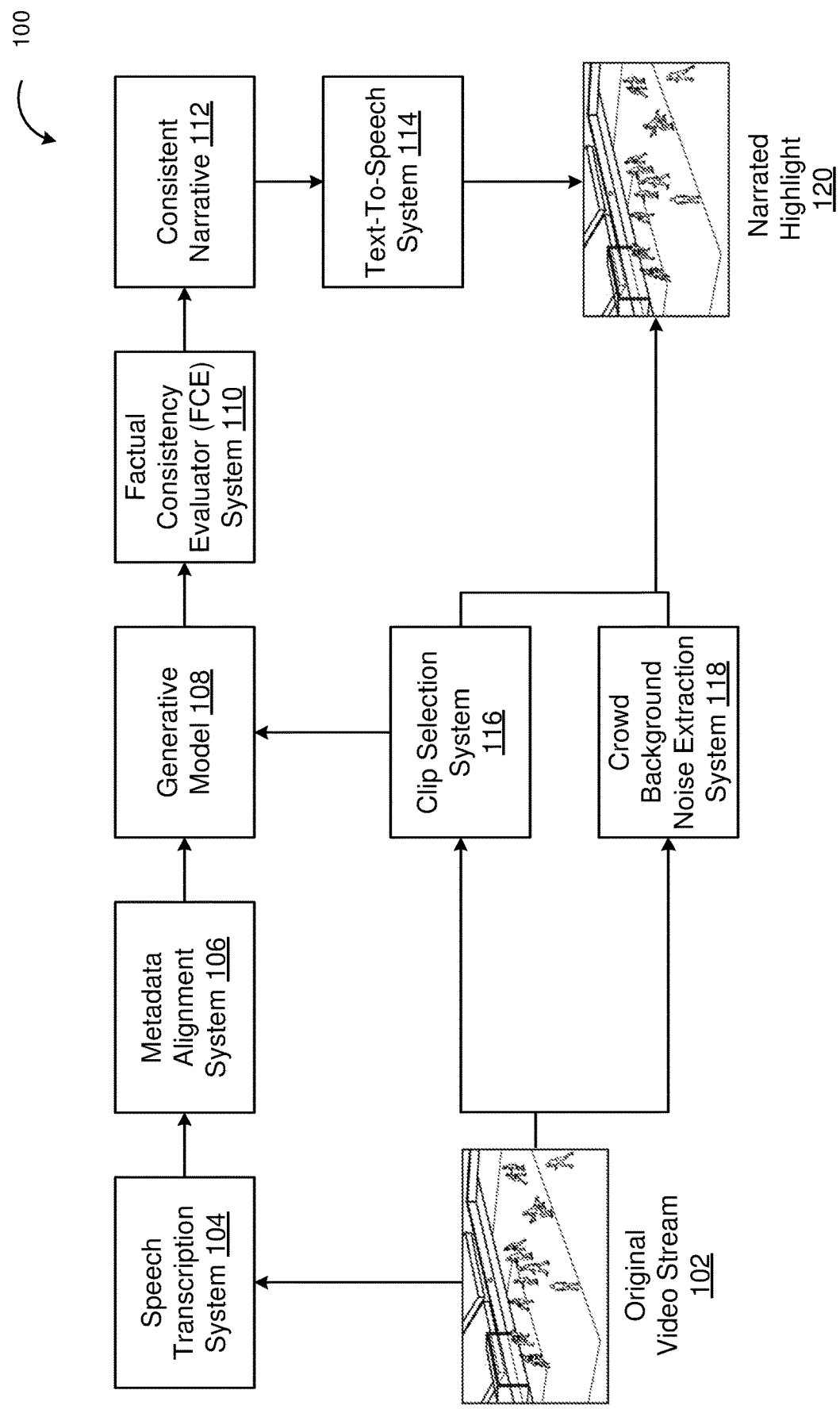
FIG. 1 illustrates a computing environment 100 in which a pipeline for producing highlights with narratives may be implemented, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for factually consistent generative narrations for events such as sporting events. While a sporting event can be several hours long, highlights can be generated to provide viewers with a condensed version of the event that focuses on critical and/or exciting moments of the match, such as when a player scores a game-winning goal. Highlights can be produced as short videos (e.g., only a few minutes in length) that showcase key moments of an event.

One of the challenges that is present in producing highlights for sporting events is that there is often a mismatch between the highlight event being shown and the original audio commentary. As an example, during a clip or portion of a sporting event that includes a critical moment, the original audio commentary may not be explaining what is happening or may include important context and details until after the critical moment, especially when such events unfold quickly or unexpectedly. Furthermore, the original audio commentary is often significantly longer than the video portion of the critical moment. This can serve as a mismatch between the intended goal of the commentator to entertain, explain, or expand on the critical moment to the live audience who is often under different time constraints than what is expected for a highlight narrative. For example, if a player scores a goal in soccer, the original audio commentary can often last significantly longer than the critical event (e.g., the scoring of the goal) because the commentator will often continue to speak and provide insight into the goal while players are celebrating after the goal, or while the players await video-assisted review (VAR) results. This mismatch can result in the original audio commentary being truncated when the clip of the critical event is shown in a highlight, resulting in an incoherent or incomplete clip.

Other challenges related to highlight narratives involves the rate and scale at which narratives are generated in a content provider environment. A content network may have hundreds of concurrent events that are being broadcasted and need highlight narratives generated. In some cases, highlight narratives are generated every few minutes for on-going events to help viewers more easily jump into an ongoing event by first viewing a highlight clip with narratives summarizing the most important events that have occurred up to the time that the viewer joins in. These can be generated on an on-going basis, hence, human narration becomes infeasible, and impractical in such cases.

According to at least one embodiment of the present disclosure, techniques described herein are directed to producing factually consistent narratives for event highlights. Narratives described herein may be produced by a generative model (e.g., a large language model (LLM) such as Chat-GPT). Furthermore, techniques described herein may include determining the factual consistency of the narratives against the original audio commentary to ensure that the generative narrative does not include additional information that is inconsistent with the original audio commentary.

Techniques described herein may also relate to the extraction of crowd background noise from an original video stream. While content providers will sometimes have separate audio channels available to directly extract crowd background noise for a sporting event, in other cases—such as when a third-party provides the video stream—a single channel is provided that has the crowd background noise, original audio commentary, etc. Including crowd background noise in the background of the highlight narrative provides for a more immersive atmosphere, sense of excitement, and more pleasant experience for the viewer. While there exist techniques to enhance or extract other types of audio such as speech and music, there are additional considerations when attempting to extract crowd background noise from an audio stream.

The above descriptions are for the purpose of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a pipeline for producing highlights with narratives may be implemented, in accordance with one or more example embodiments of the present disclosure.

In various embodiments, a pipeline for producing highlights with narratives from an original video stream 102 is depicted in FIG. 1, the computing environment 100 comprises: a speech transcription system 104, a metadata alignment system 106, a generative model 108, a factual consistency evaluator (FCE) system 110 that produces a consistent narrative 112, a text-to-speech system 114, a clip selection system 116, and crowd background noise extraction system 118. The pipeline may be used to produce a narrated highlight 120.

According to at least one embodiment of the present disclosure, an end-to-end solution for generating highlight narratives is described. Some or all of the following techniques may be utilized (e.g., in combination with each other or as discrete features): creating highlight narratives by leveraging large language models (LLMs) and prompt engineering; transferred learning techniques to improve the factual consistency of pre-trained LLMs; ensuring that generative narratives are factually consistent with the original video stream and preventing/eliminating "hallucinations"; performing crowd background noise extraction; and more.

An end-to-end system for factually consistent generative narrations may include a pipeline of several components, including but not limited to a speech transcription system, a metadata alignment system, a generative model such as a GPT-based large language model (LLM) system, a factual consistency evaluator (FCE) system, a consistent narrative system, a text-to-speech system, a crowd background noise extraction system, and more. A video stream may be provided as an input to this pipeline and henceforth be referred to as an original video stream 102. The video stream may be "original" in the sense that it is the digital media content that is provided to the pipeline producing the highlights. According to various embodiments, the original video stream comprises video and audio content. The video content may, for example, be a movie, television show, live sporting event, and so on and so forth. The audio may include, for example, audio from a live sporting event as well as commentary of the event that is provided by a broadcaster. In some embodiments, separate audio channels are provided for the commentary (e.g., to allow for viewers to select from different commentary teams or commentary in different languages). In some embodiments, a composite audio stream includes both the live audio from the event as well as the commentary audio.

In various embodiments, the original video stream 102 or a portion thereof is provided to a speech transcription system 104. The speech transcription system 104 may refer to hardware, software, or a combination thereof that analyzes the original video stream 102 (e.g., in portions or in its entirety) and maps the speech to its corresponding text. A speech-to-text service of a computing resource service provider (e.g., cloud service provider) may be utilized to determine a text-based representation of audio from the original video stream 102.

In various embodiments, metadata messages for the original video stream 102 may be obtained from an external source. For example, if the original video stream 102 is for a sporting event, the metadata messages may be provided by a third-party vendor that generates a play-by-play record of what is unfolding in the sporting event. These events may be at different levels of granularity. For example, in American football, the events may include penalties, timeouts, the results of each down, such as the scoring of a touchdown, an interception, and so on and so forth. In some embodiments, the metadata messages are determined directly from the original video stream 102. For example, a computer vision (CV) model may be utilized to analyze the original video stream 102 and generate annotations for the events that are detected within the original video stream.

Metadata alignment system 106 may refer to software, hardware, or a combination thereof that maps or otherwise associates the metadata messages to the original video stream 102 when needed. As an example, the broadcast for a sporting event may occur at time $t_0$ with a pre-game show, the singing of the national anthem, or other activities related to the game itself but are not actually part of the game. The game itself may begin at a later point in time, $t_1$. The metadata message may be encoded in a format that is relative to the game time or game clock. For example, in American football, there may be a metadata message for "[15:00] Kickoff-Generic City Gladiators kicked off to Any Town Angels; touchback." As can be seen in the example above, metadata messages may be recorded relative to the game clock, and metadata alignment system 106 may be utilized to determine a mapping between the game clock times of the metadata messages with particular points in the video stream where they occur. In some embodiments, computer vision models may be utilized to analyze the original video stream 102 and determine when the metadata message matches the events in the video stream.

In some embodiments, a clip selection system 116 is utilized to extract one or more highlight clips from the original video stream 102. A highlight clip may refer to a contiguous portion of the original video stream. It should be noted that a highlight clip may include the original audio commentary that will be subsequently replaced by the generative narration in the narrated highlight 120. Various artificial intelligence (AI) and/or machine learning (ML) techniques may be utilized to determine the one or more highlight clips from the original video stream 102. In some embodiments, metadata messages are utilized to determine some or all of the highlight clips. As an example, certain types of events (e.g., goals, penalty kicks, and so on) may be selected as highlight clips based on their timestamps in the metadata messages.

According to at least one embodiment of the present disclosure, a prompt is generated in the following manner: first, a highlight clip is obtained. The highlight clip may be a contiguous segment of the original video stream. A time window over which the highlight clip occurred may be determined. For example, the highlight clip may start at a first time $t_{start}$ and end at a subsequent time $t_{end}$. Next, a portion of metadata corresponding to this time window may be determined. For example, all metadata collected from $t_{start}$ to $t_{end}$ may be collected. Furthermore, transcribed text for the live commentary may be collected for a time window that encompasses the highlight clip, including a shoulder or bumper region e.g., collected from $t_{start}-\delta_1$ to $t_{end}+\delta_2$ where $\delta_1$, $\delta_2 > 0$. In some cases, $\delta_1 = \delta_2$. It should be noted that this transcribed text may include the text for audio commentary that was from before and/or after the highlight clip, as well as the text for the audio commentary during the highlight clip. The additional audio commentary from before and/or after the highlight clip may be used to serve as a grounding text to validate the factual consistency of the narrative that will be generated by the generative model 108. A prompt may be generated based at least in part on the metadata for the clip and the transcribed text of the audio commentary for the clip and/or surrounding commentary, as described above. The prompt may be provided to a generative model 108 with instructions to generate a text-based narrative. In various embodiments, the prompt is produced according to techniques described elsewhere in this disclosure, such as those discussed in connection with FIG. 3.

A generative model 108 may refer to a type of machine learning model that is capable of generating new data samples that resemble the training data it was trained on. A generative model 108 may be trained to learn underlying patterns and structures from training data and uses that knowledge to generate new, previously unseen data points. Generative models can be applied to various domains, including images, audio, and text. In various embodiments, the generative model 108 of FIG. 1 is a large language model (LLM) that is trained to focus on generating text. Language models, such as GPT-3 may be trained on an extremely large corpus of text data to learn the statistical relationships between words, phrases, and sentences. These models can then generate coherent and contextually relevant text based on a given prompt or input. Examples of generative models that may be utilized include some or all of the following: GPT-3 based models; GPT-J based models; GPT-J-6B based models; command based models; BLOOM based models; FLAN based models; LLaMA based models; BERT based models; and more. Accordingly, an appropriate generative model 108 may be selected and used to generate a text-based output from a prompt that provides instructions to generate a text-based narrative given a context and a set of information. The context may be determined from the metadata messages and the information may be the transcribed commentary for the highlight clip and/or adjacent portions of the video stream (for example, commentary from a shoulder/bumper region before and/or after the highlight may be included).

One of the difficulties in using generative models such as GPT-based large language models is that the models can sometimes generate inaccurate or misleading narratives that are not consistent with the source of information, the prompt, that it is given. This phenomenon is called "hallucinations." In various embodiments, the possibility of a generative model 108 producing factually incorrect narratives is addressed by a factual consistency evaluation (FCE) system 110 that detects hallucinations automatically by predicting whether a generated text is factually consistent with respect to a grounding text. In various embodiments, the task of Textual Entailment (ANLI) or Natural Language Inference (NLI) and Question Generation-Question Answering (QG-QA) are methods that can be utilized for text summarization. In NLI methods, a hypothesis and premise are used to determine whether the hypothesis is entailed by the premise, contradicted by it, or is neutral with regard to it. The entailment probability can be used as a factual consistency score. In QG-QA methods, a Name-Entity-Recognition (NER) model can be used to generate spans on the premise that leads to generated questions that will be asked to the hypothesis and the answer is compared to the span.

In various embodiments, the FCE system 110 of FIG. 1 uses a DeBERTAa based model to determine and perform a factual consistency evaluation between a hypothesis and a premise. The model performs an evaluation and determines probabilities of entailment, contradiction, and neutrality between two statements. These statements may respectively be the generative narration and source information comprising one or more of the third-party metadata messages, transcribed commentary, and/or the highlight clip. The highlight clip may be analyzed using a computer vision model that provides low level semantic information regarding the clip. The probabilities of entailment, contradiction, and neutrality may be mapped to a single factual consistency score that encodes the likelihood that the generative narration is factually consistent or factually inconsistent with the source materials.

A Decoding-enhanced BERT with Disentangled Attention (DeBERTa) based model that is used in FCE system 110 may refer to a type of large-scale pre-trained language model that is based on the Transformer architecture. DeBERTa incorporates several key enhancements compared to Bidirectional Encoder Representations from Transformers (BERT) based models, such as the use of disentangled attention, which allows the model to focus on different aspects of the input text simultaneously. Additionally, DeBERTa utilizes a decoding mechanism that allows bidirectional decoding during pre-training. This decoding process helps the model better understand and generate text by incorporating future context.

In various embodiments, a first generative narrative is evaluated by the FCE system 110 to determine a first factual consistency score. The first factual consistency score may be compared to a threshold value. The threshold value may be a predetermined value that can be tuned to the desired sensitivity for a particular event or audience. If the first factual consistency score is accepted, then the first generative narrative is an accepted narrative and may be used to generate narrated highlight 120. However, if the first factual consistency score is less than the threshold value, then it is rejected. The generative model 108 may be provided with the same prompt and instructed to produce a second generative narrative. It is noted that due to the probabilistic nature of LLMs, the same prompt can produce different narratives. Accordingly, it should be appreciated that once the second generative narrative is produced, it may be then evaluated by the FCE system to determine a second factual consistency score, which is compared to the threshold value. This process may be repeated until a suitable narrative is generated and accepted. The accepted narrative is the consistent narrative 112 of FIG. 1. The text-based consistent narrative 112 may be provided as an input to a text-to-speech system that is used to provide the commentary for narrated highlight 120. In various embodiments, the narrated highlight 120 is synchronized with the corresponding highlight clips provided by the clip selection system 116.

In various embodiments, a crowd background noise extraction system 118 is utilized to extract a crowd background noise channel from original video stream 102, for example, by using techniques described in greater detail below in FIG. 5. Crowd background noise extraction may be viewed as a speech separation task in which a discrete input waveform $x(t) \in \mathbb{R}^T$ is given and the speech separation task involves expressing the estimation of C sources $s_1(t), \ldots, s_c(t) \in \mathbb{R}^T$, where:

$$x(t) = \sum_{i=1}^{C} s_i(t)$$

The C different sources may be estimated from waveform x (t). In particular, crowd background noise extraction involves the separation of the input waveform into two sources, the background/crowd background noise and the commentary:

$$x(t)=s(t)+n(t)$$

Where $s(t) \in \mathbb{R}^T$ refers to the waveform associated with the commentators and $n(t) \in \mathbb{R}^T$ is the waveform associated with the crowd background noise. Deep learning may be utilized in end-to-end audio source separation in time-domain. Crowd background noise extraction may utilize an efficient attention-based architecture, such as TDANet, SepFormer, and others. The crowd background noise determined by crowd background noise extraction system 118 may be combined with the consistent narrative 112 to produce narrated highlight 120.

Figure 2:
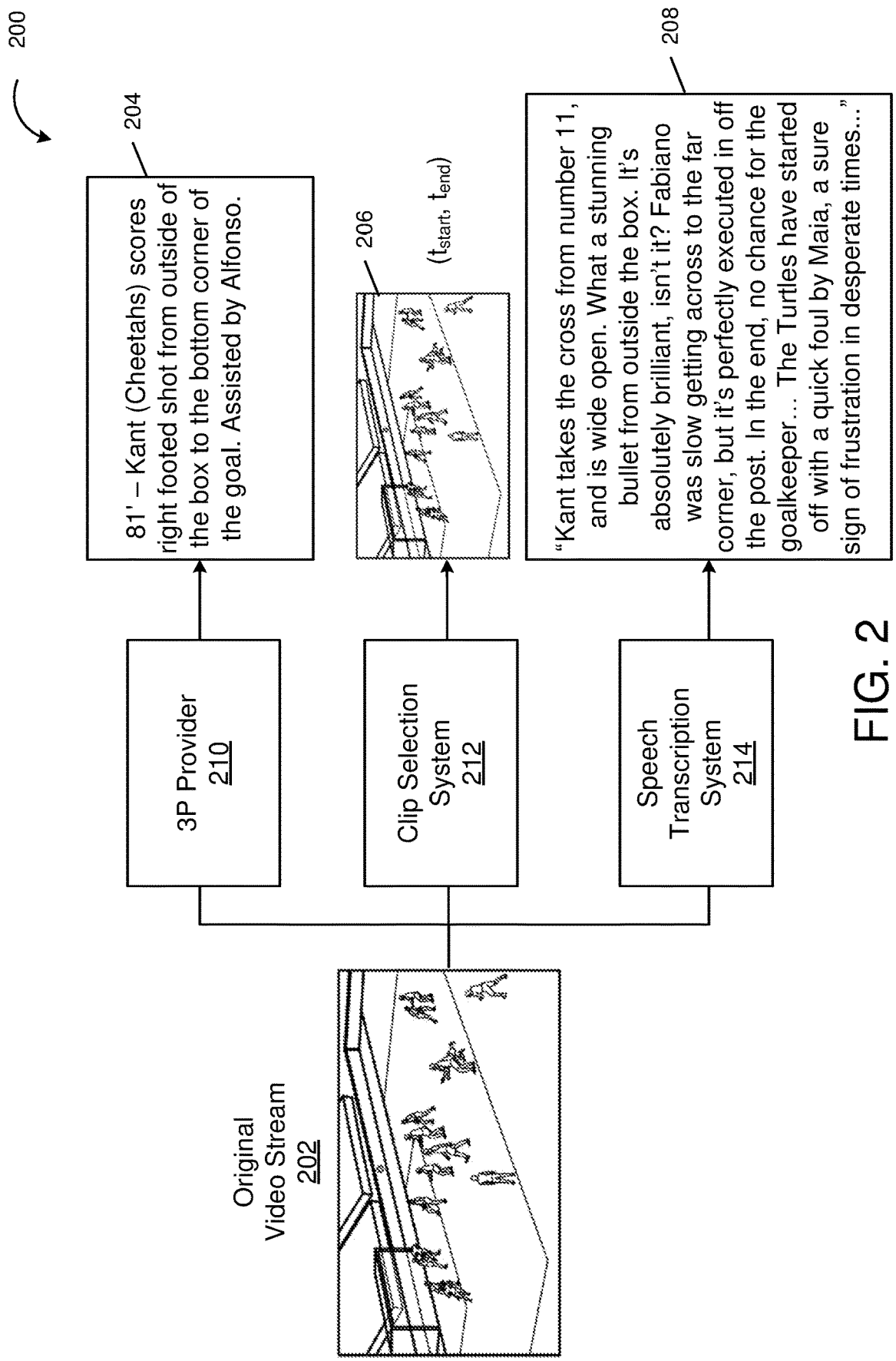
FIG. 2 illustrates a computing environment 200 for processing of extracting metadata messages, highlight clips, and transcribed commentary from a video stream for producing highlights with narratives, in accordance with one or more example embodiments of the present disclosure.

FIG. 2 illustrates a computing environment 200 for processing of extracting metadata messages, highlight clips, and transcribed commentary from a video stream for producing highlights with narratives, in accordance with one or more example embodiments of the present disclosure.

In various embodiments, an original video stream 202 is a data source that is used to determine three distinct types of inputs to the generative narrations pipeline-metadata messages 204, highlight clips 206, and transcribed commentary 208.

The original video stream may, as described above in connection with FIG. 1, refer to a live video stream of a sporting event or other digital media content. The videos stream may be provided to a third party provider (3P provider 210) that produces metadata messages. The metadata messages may be play-by-play or text-based commentary of the critical or important events of a game. For example, two illustrative metadata messages may include:

"81"-Cheetahs 3, Turtles 1. Kant (Cheetahs) scores right footed shot from outside of the box to the bottom corner of the goal. Assisted by Alfonso.

"82" Foul by Maia (Turtles)

While a third-party provider is depicted in FIG. 2 as determining the metadata messages 204, other systems may also be suitable for generating metadata messages. For example, a content provider may use the original video stream 202 and directly analyze the video stream using computer vision (CV) or AI/ML models to determine the metadata messages 204 without needing to obtain the metadata messages from a third party.

In some embodiments, a clip selection system 212 is utilized to extract one or more highlight clips 206 from the original video stream. A highlight clip 206 may refer to a contiguous portion of the original video stream. It should be noted that a highlight clip may include the original audio commentary that will be subsequently replaced by the generative narration that is produced by the pipeline. Various artificial intelligence (AI) and/or machine learning (ML) techniques may be utilized to determine the one or more highlight clips from the original video stream. For example, if a metadata message 204 indicates a goal was scored in the $81^{st}$ minute, then a highlight clip may be determined by analyzing or otherwise determining a portion of the video on or around the $81^{st}$ minute that corresponds to the metadata message.

In various embodiments, the original video stream 202 or a portion thereof is provided to a speech transcription service 214 to extract text-based transcribed commentary 208. The speech transcription service 214 may refer to hardware, software, or a combination thereof that analyzes the original video stream 202 (e.g., in portions or in its entirety) and maps the speech to its corresponding text. A speech-to-text service of a computing resource service provider (e.g., cloud service provider) may be utilized to determine a text-based representation of audio from the original video stream.

The data derived or otherwise extracted from the original video stream 202—metadata messages 204, highlight clips 206, and transcribed commentary 208, may be utilized by downstream systems and processes to produce a generative narrative. For example, the metadata messages 204 and the transcribed commentary 208 may be utilized as part of a prompt engineering routine that determines as prompt for producing a generative narrative, in accordance with techniques described below in connection with FIG. 3. For example, the metadata messages and transcribed commentary for a highlight clip may be provided as source information that a text-based narrative produced by a generative model is compared against to validate its factual consistency, in accordance with techniques described below in connection with FIG. 4. For example, the highlight clip may be processed to perform crowd background noise extraction, in accordance with techniques described below in connection with FIG. 5.

Figure 3:
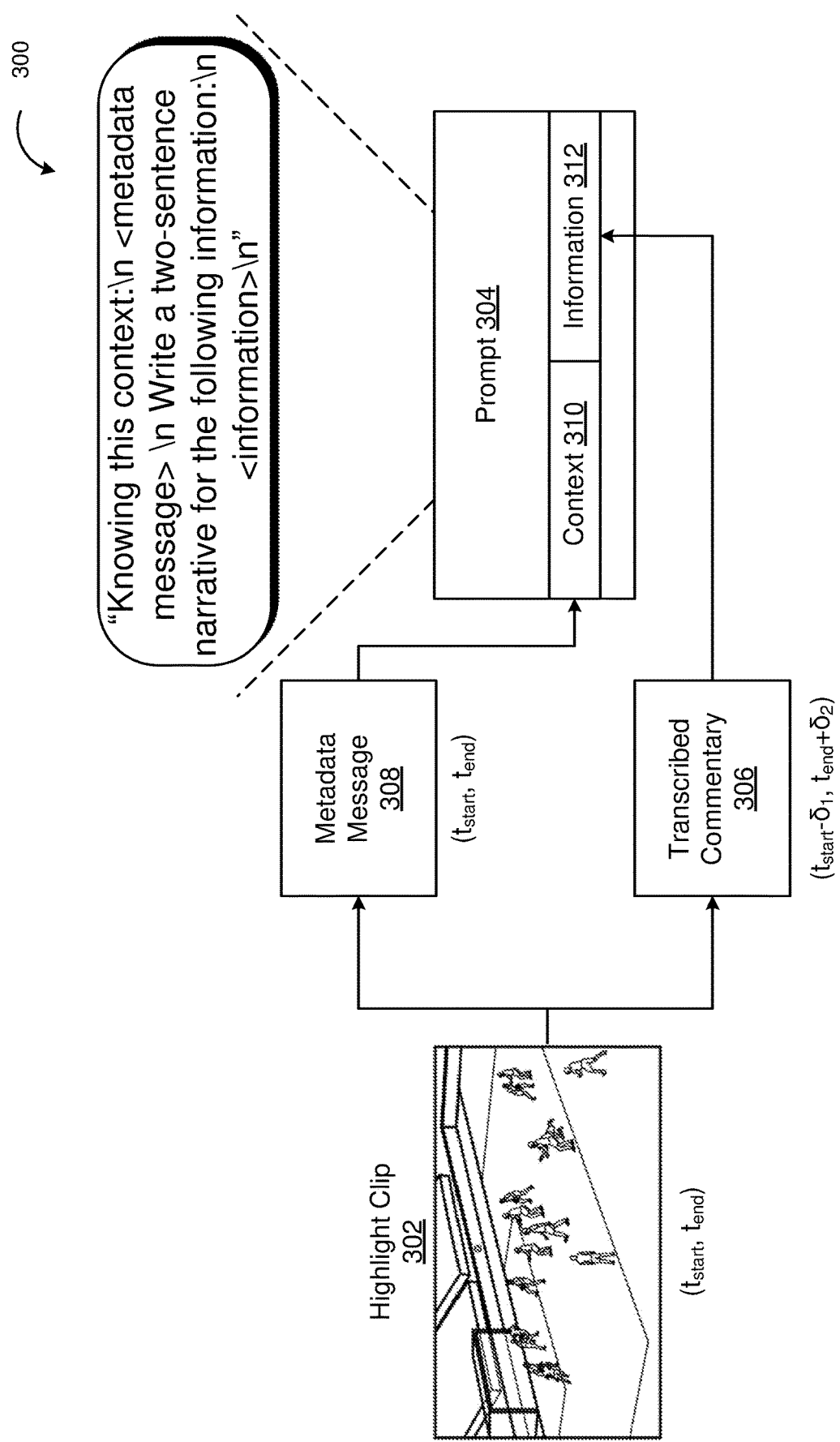
FIG. 3 illustrates a computing environment 300 for prompt engineering to determine a prompt that instructs a generative model to produce narratives for a highlight clip, in accordance with one or more example embodiments of the present disclosure.

FIG. 3 illustrates a computing environment 300 for prompt engineering to determine a prompt that instructs a generative model to produce text-based narratives for a highlight clip 302, in accordance with one or more example embodiments of the present disclosure.

In various embodiments, a prompt generation system is utilized to determine a prompt 304 that is provided to a large language model (LLM). A prompt 304 serves as instructions to a generative model such as GPT-based models to guide its response or generate a specific type of output. A prompt 304 serves as the input to an LLM and provides the LLM with context and directions for the model's subsequent output. Prompt 304 can take many different formats and can be crafted to shape the desired behavior and response of the model. A prompt can influence the style, tone, and content of a model's generated text. The choice of words, phrasing, and the information provided in the prompt can significantly impact the output received.

Prompt engineering may, in various embodiments, refer to the process of determining and optimizing the prompts that are utilized by a generative model to produce high-quality and relevant text-based narratives in response to one or more inputs. Different prompts can illicit vastly different responses from generative models. Prompt engineering techniques described herein may be utilized to address various limitations of LLMs, including poor output coherence, lack of context awareness, and the possibility of generating biased or offensive content.

In various embodiments, a process for prompt engineering may be performed in accordance with FIG. 3. A prompt 304 may be generated based on the specific needs of the narrations that are desired. For example, in the context of sports events, the desired behavior may relate to creating an engaging narrative rather than simply a summary of a given play. This nuance may be difficult for a generative model to capture without a fine-tuned prompt.

According to at least one embodiment, a prompt is generated with an instruction to produce a text-based narrative. This may be in contrast to instructions to produce a summary. For example, two different outputs may be produced from the same commentary based on a first prompt that provides an instruction to generate a narrative and a second prompt that provides an instruction to generate a summary based on the same piece of information (e.g., transcribed commentary 306 for a clip):

| Prompt | Output |
|---|---|
| Write a two-sentence narrative for the following information:\n <information> \n | William took a stunning free kick, curling it around the wall and into the back of the net off the post. With this goal, the Cheetahs have equalized and now look to go on and win it with plenty of time left in the game. |
| Write a two-sentence summary for the following information:\n <information> \n | William scored an amazing free kick for the Cheetahs to level the score at 2-2. Both teams now have a chance to win, but the Cheetahs must focus on keeping their defense strong. |

In various embodiments, the information 312 corresponds to the transcribed commentary for a clip as well as transcribed commentary from shortly before and/or after the clip. While the inclusion of this additional bumper or shoulder region may be useful in capturing additional relevant commentary that occurs before or after the clip (e.g., providing additional context 310 into how a goal unfolded and/or its significance to the game state) it also has the possibility of including additional commentary that is irrelevant to clip.

Metadata for the clip may be used to provide a stimulus to the model and aid in the focus on the specific events that occur during the clip. In various embodiments, the prompt generation system will obtain metadata messages 308 for the time window of the clip, not including metadata messages from the shoulder or bumper regions. The information (from the clip and the bumper region(s)) and metadata (from just the clip) may be used to generate a prompt. The metadata message 308 may be used as a context 310 clue to help the model focus on the relevant portions of the information. Furthermore, the prompt may include instructions regarding the type of output to generate, for example, specifically to produce a text-based narrative as described above. An example prompt may be as follows:

Knowing this context: \n<metadata message> In Write a two-sentence narrative for the following information: \n<information>\n An example of a prompt with and without the metadata context for a clip is provided below:

| Prompt | Output |
|---|---|
| Write a two-sentence narrative for the following information:\n <information> \n | Kant's strike from the edge of the box took a lucky deflection, restoring the Cheetah's two-goal buffer and giving Kant his second goal of the season. William was then fouled by Maia as both teams displayed clumsy defending throughout the match. |
| Knowing this context: \n <metadata message> \n Write a two-sentence summary for the following information:\n <information> \n | Giorgio Kant unleashed a powerful right-footed shot from outside the box that found its way into the bottom corner with a deflection, restoring the Cheetah's two-goal lead and giving them an unassailable 3-1 advantage. Alfonso provided the assist for Kant's goal, which was met with luck as well as skill to give him his second of the season. |

It should be noted that the prompt uses only the information regarding a goal that is scored (e.g., an event that occurs during the clip) but then also includes output text relating to an irrelevant foul that occurred after the clip. In contrast, the prompt that included the metadata to guide the model does not include any output text related to the irrelevant foul and the output is tightly focused on the goal that was scored in the highlight clip. A prompt generated in accordance with technique(s) described in connection with FIG. 3 may be provided as an input prompt to a generative model to produce an output text (e.g., a text-based narrative).

Figure 4:
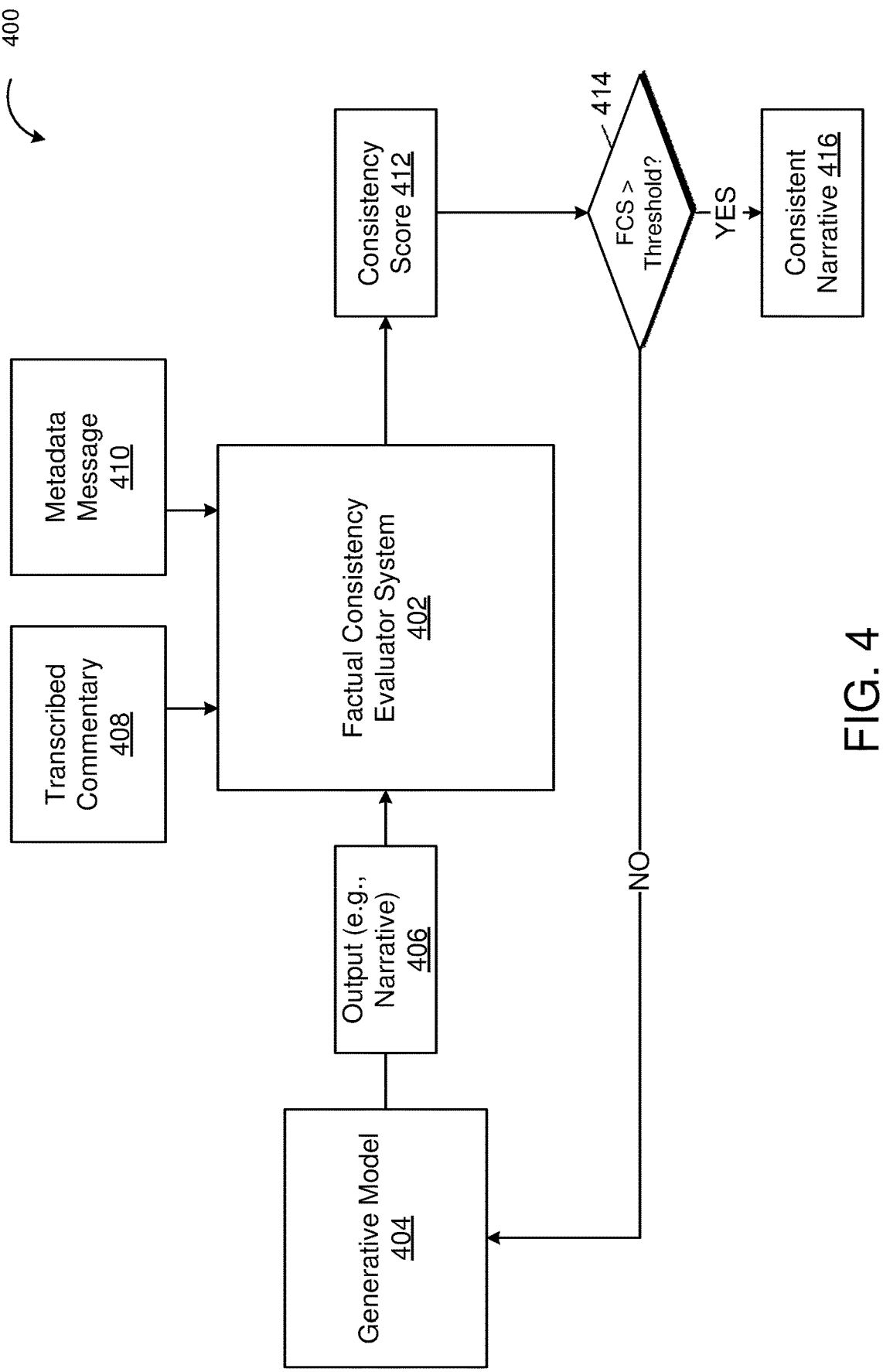
FIG. 4 illustrates a computing environment 400 for validating the output of a generative model for factual consistency, in accordance with one or more example embodiments of the present disclosure.

FIG. 4 illustrates a computing environment 400 for validating the output of a generative model for factual consistency, in accordance with one or more example embodiments of the present disclosure.

Factual consistency evaluator (FCE) system 402 may be utilized to validate the factual consistency of outputs or samples produced by a generative model. Factual consistency as described herein may refer to whether the factual information conveyed in a text is consistent with factual information conveyed by a source of information.

In various embodiments, the output of a generative model 404 is validated for factual consistency. Generally speaking, a generative model has the possibility to hallucinate. When a generative model hallucinates, it means that the model produces outputs that do not accurately represent or align with the data it was exposed to. There is a possibility for generative models to produce an output that is fabricated or fictional rather than being faithful to the patterns and characteristics of the real-world data it learned from. Hallucinations can occur in generative models for various reasons. Due to the inherent nature of the generative process, generative models are trained to learn statistical patterns and dependencies in the training data. However, they may not have a deep understanding of the semantics, context, or real-world constraints of the data. As a result, when generating new samples, the model can sometimes produce outputs that are implausible, unrealistic, or even nonsensical.

For example, in the context of a text-based generative model, hallucinations could manifest as the generation of incorrect or inaccurate information, the creation of entirely fictional events or entities, or the production of sentences that lack coherence or logical flow. These hallucinations often arise from the model's attempt to generate new and diverse outputs based on the patterns it has learned, but without a grounding in a deeper understanding of the real-world context.

The task of textual entailment or Natural Language Inference (NLI) may refer to a process for determining, given two sentences, a hypothesis and a premise, whether the hypothesis is entailed by the premise, contradicts it, or is neutral with regard to it. The resemblance of NLI to factual consistency evaluation has led to utilizing NLI models for measuring factual consistency. In various embodiments, FCE system 402 utilizes a DeBERTa based model. The model may be fine-tuned based on NLI-based data sets such as MultiNLI, Fever-NLI, Adversarial-NLI, LingNLI, WANLI, or other such datasets comprising hypothesis premise pairs. The model may be used in a zero-shot classification format. In various embodiments, the model is fine-tuned based on a domain dataset by using a prior sports dataset to train the model to generate highlights for a particular sport. In various embodiments, a consistency score is determined by applying a softmax function to the entailment and contradiction probabilities and consider the entailment final probability. In various embodiments, the model is trained using a binary cross entropy loss. In various embodiments, for testing, a 5-Fold cross validation strategy is applied.

Factual consistency evaluation via a Question Generation-Question Answer (QG-QA) process may be implemented as follows: first, from a generated text (e.g., a narrative), spans are generated from a name entity recognition model. These spans may correspond to answers of potential questions that are generated by the QG model. Then, the questions are presented to the grounding text or source information using a QA model. Finally, the spans and the answers are compared to obtain a score that represents the consistency evaluation.

Given an output 406 (e.g., narrative) produced by a generative model 404 for a highlight clip, the output may be compared for factual consistency against a grounding text that is based on the transcribed audio commentary 408 and/or metadata messages 410 of the highlight clip. A consistency score 412 may be produced, which may be in the range of 0 to 1, 0 to 100, or any other suitable range. Generally, the consistency score may be implemented so that lower values correspond to lower factual consistency of the narrative as compared to the grounding text, and higher values correspond to higher factual consistency. In various embodiments, the consistency score is compared 414 against a threshold value. The threshold value may be a predefined value that is configurable by the user. In various embodiments, if the consistency score is lower than the threshold value, then the narrative may be discarded and the generative model may be instructed to produce another narrative. The narrative generation process may be repeated with the same inputs to the generative model. Due to generative models being probabilistic in nature, the model out will, generally speaking, differ from the previously generated narrative. The subsequent narrative similarly may be validated for factual consistency and will be accepted if the consistency score exceeds the threshold value or likewise rejected if the consistency score is below the threshold value. When a generative model output has a consistency score 412 that exceeds the threshold, it is accepted and may be used as consistent narrative 416 or consistent output, for example, as part of downstream processes in the pipeline described in connection with FIG. 1.

Figure 5:
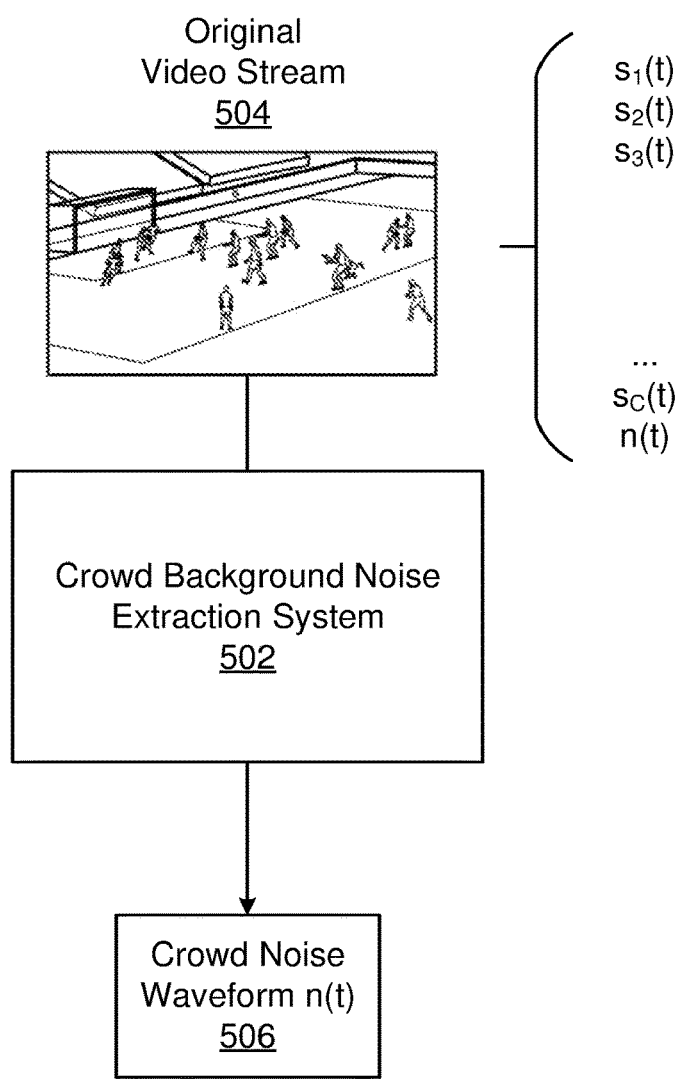
FIG. 5 illustrates a computing environment 500 for performing crowd background noise extraction, in accordance with one or more example embodiments of the present disclosure.

FIG. 5 illustrates a computing environment 500 for performing crowd background noise extraction, in accordance with one or more example embodiments of the present disclosure.

In various embodiments, a crowd background noise extraction system 502 is utilized to extract crowd background noise from an original video stream 504 that includes both crowd background noise as well as other types of audio (e.g., commentary). Crowd background noise may be extracted and then added as background in the generated narratives to provide viewers with a more immersive viewing experience.

In various embodiments, crowd background noise extraction is performed as follows: given a discrete input waveform $x(t) \in \mathbb{R}^T$, a speech separation task may be expressed as the estimation of C sources $s_1(t), \ldots, s_c(t) \in \mathbb{R}^T$, where:

$$x(t) = \sum_{i=1}^{C} s_i(t)$$

The C different sources may be estimated directed from waveform x (t). In particular, crowd background noise extraction involves the separation of the input waveform into two sources, the background/crowd background noise and the commentary:

$$x(t) = s(t) + n(t)$$

Where $s(t) \in \mathbb{R}^T$ refers to the waveform associated with the commentators and $n(t) \in \mathbb{R}^T$ is the waveform 506 associated with the crowd background noise. Deep learning may be utilized in end-to-end audio source separation in time-domain. Crowd background noise extraction may utilize an efficient attention-based architecture, such as TDANet, SepFormer, and others.

In various embodiments, SepFormer is utilize for crowd background noise extraction, although other models (such as TDANet) may also be suitable alternatives. The model used for crowd background noise extract may be trained on a dataset that comprises a composite audio stream (x (t)) and crowd background noise only audio stream (n (t)) that serves as the ground truth. The model may be finely tuned based on a dataset with such pairs of audio streams.

Figure 6:
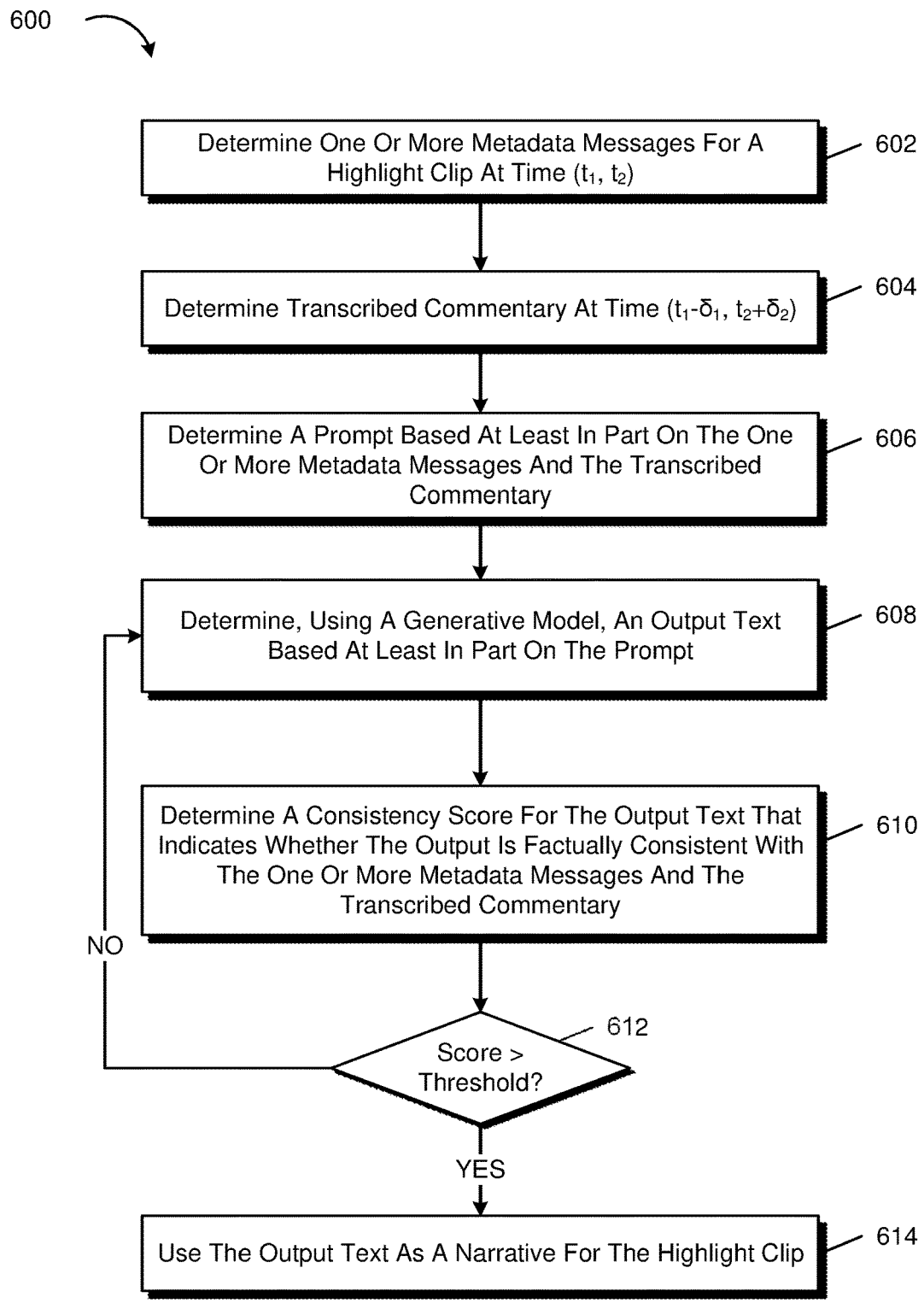
FIG. 6 shows an illustrative example of a process 600 for determining a generative narration, in accordance with one or more example embodiments of the present disclosure.

FIG. 6 shows an illustrative example of a process 600 for determining a generative narration, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5, 7, and 8. In at least one embodiment, process 600 or a portion thereof is implemented by a computing resource service provider.

In various embodiments, process 600 comprises a step 602 to determine one or more metadata messages for a highlight clip for a first window of time $t_1$ to $t_2$ in a video stream. In various embodiments, the highlight clip is identified or otherwise selected by a clip selection system, such as those described in connection with FIG. 1. Each highlight clip may be processed according to process 600 to produce a highlight video that includes each of the highlight clips as well as audio of their corresponding generated narratives.

In various embodiments, process 600 comprises a step 604 to determine transcribed commentary over a second window of time. The second window of time may fully encompass the first window of time, the second window of time fully including the first window of time as well as a first shoulder region before the first window of time and/or a second shoulder region subsequent to the first window of time. In various embodiments, the shoulder(s) are of fixed duration. For example, the shoulders may be 15 seconds each. In some embodiments, the second window of time is fixed, such that if the highlight clip is longer, the shoulder regions are smaller. The second window of time may be from $t_1-\delta_1$ to $t_2+\delta_2$ where $\delta_1, \delta_2>0$.

In various embodiments, process 600 comprises a step 606 to determine a prompt based at least in part on the one or more metadata messages and the transcribed commentary. In various embodiments, the prompt is determined according to techniques described elsewhere in this disclosure, such as those discussed in connection with FIG. 3. In various embodiments, the prompt comprises a context portion that is determined based at least in part on the one or more metadata messages, an information portion that is based at least in part on the portion of the transcribed commentary, and an instruction to generate a text-based "narrative". In some embodiments, additional constraints are imposed on the generative model through the prompt. For example, the prompt may limit the size of the output text to a certain number of sentences or characters. The constraint may be determined based at least in part on the length of the highlight clip. For example, if a highlight clip is 30 seconds in length, the constraints may impose a two-sentence size for the narrative. If the clip is 60 seconds in length, the narrative may be constrained to four sentences in length. An example prompt may be as follows:

Knowing this context: \n<metadata message(s)>\nIn Write a two-sentence narrative for the following information: \n<transcribed commentary>\n In various embodiments, process 600 comprises a step 608 to determine, using a generative model, an output text based at least in part on the prompt. The generative model may be a large language model (LLM). Examples of generative models that may be utilized include some or all of the following: GPT-3 based models; GPT-J based models; GPT-J-6B based models; command based models; BLOOM based models; FLAN based models; LLaMA based models; BERT based models; and more.

In various embodiments, process 600 comprises a step 610 to determine a consistency score for the output text that indicates whether the output is factually consistent with the one or more metadata messages and the transcribed commentary. In various embodiments, the consistency score is determined using a factual consistency evaluation system, such as those described in connection with FIG. 4.

In various embodiments, process 600 comprises a step 612 to determine whether the consistency score exceeds a threshold value. The threshold value may be a predefined value that is configurable by the user. In various embodiments, if the consistency score is lower than the threshold value, then the narrative may be rejected or discarded and the generative model may be instructed to produce another narrative by proceeding to step 608. The narrative generation process may be repeated with the same inputs to the generative model. Due to generative models being probabilistic in nature, the model out will differ, generally, from the previously generated narrative. The subsequent narrative may similarly be validated for factual consistency and will be accepted if the consistency score exceeds the threshold value or likewise rejected if the consistency score is below the threshold value. An output text that is accepted may be referred to as a consistent narrative.

In various embodiments, process 600 comprises a step 614 to use the consistent narrative for the highlight clip. Step 614 may be performed contingent upon the consistency score indicating that the output text is factually consistent. In various embodiments, a narrated highlight video comprises multiple clips, each with their own consistent narrative. In some embodiments, crowd background noise extraction is performed and combined or mixed with the narratives to provide a narrated highlight video that is more immersive and exciting to the viewer.

Figure 7:
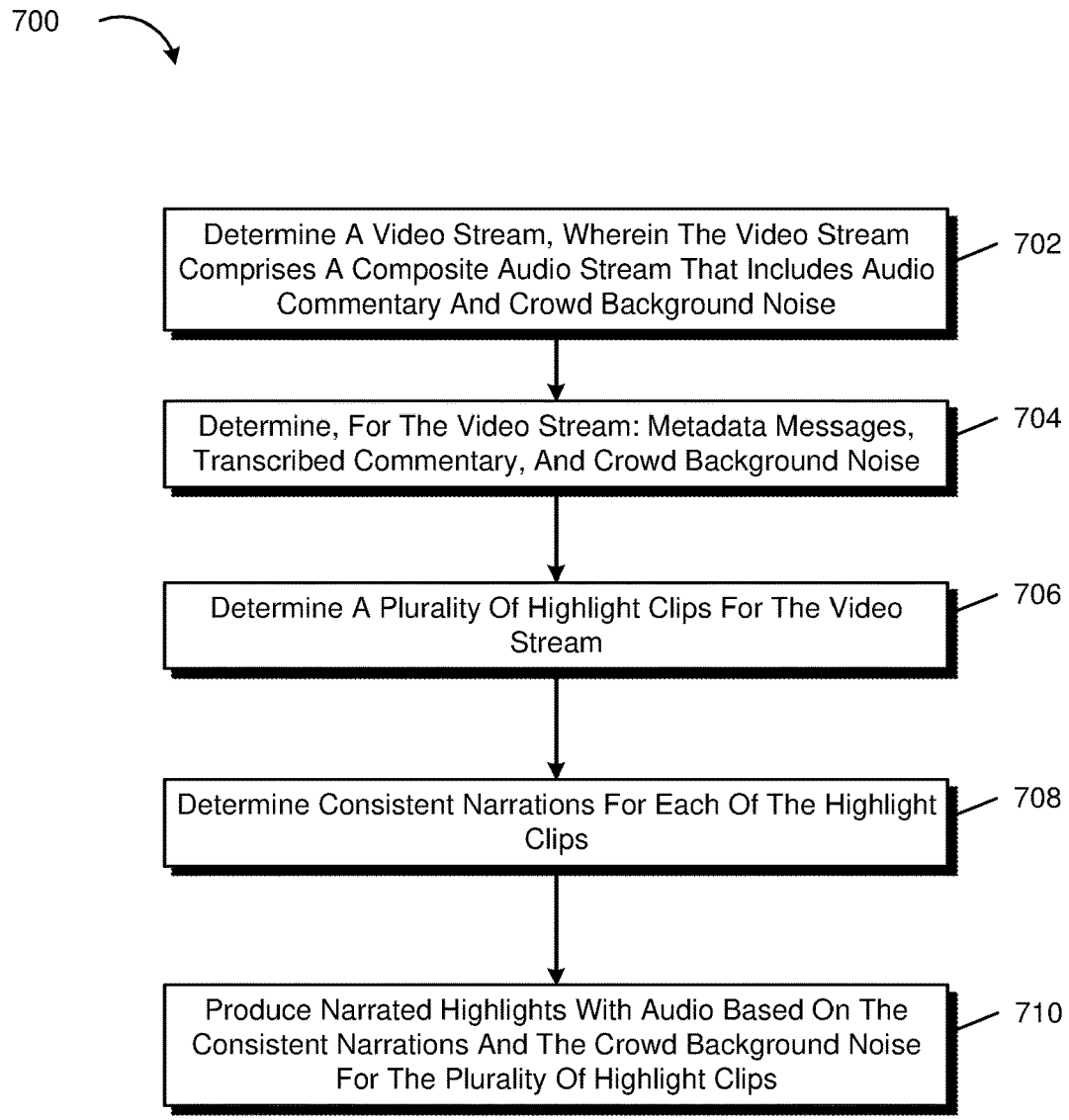
FIG. 7 shows an illustrative example of a process 700 for producing narrated highlights, in accordance with one or more example embodiments of the present disclosure.

FIG. 7 shows an illustrative example of a process 700 for producing narrated highlights, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-6 and 8. In at least one embodiment, process 700 or a portion thereof is implemented by a computing resource service provider.

In various embodiments, process 700 comprises a step 702 to determine a video stream, wherein the video stream comprises a composite audio stream that includes audio commentary and crowd background noise. It should be noted that in some embodiments, separate audio channels are known or otherwise provided and in such embodiments, performing techniques related to crowd background noise extraction may be avoided if one of the audio channels already includes the crowd background noise.

In various embodiments, process 700 comprises a step 704 to determine, for the video stream: metadata messages, transcribed commentary, and crowd background noise. In some embodiments, process 700 comprises a step 706 to determine a plurality of highlight clips for the video stream. In various embodiments, metadata messages are texted based annotations for the video stream and supplied by a third-party (3P) provider. In some embodiments, audio commentary of the video stream is transcribed using a speech transcription system or service. In some embodiments, a clip selection system is used to select or otherwise determine one or more highlight clips. In various embodiments, a crowd noise extraction system is utilized to extract the crowd background noise into a discrete channel. In various embodiments, techniques described in connection with FIG. 1, FIG. 2, and/or FIG. 5 may be utilized in the determination of various data described in this paragraph.

In various embodiments, process 700 comprises a step 708 to determine consistent narrations for each of the highlight clips. In various embodiments, as part of a pipeline to produce a narrated highlight video, consistent narrations may be generated for each of the highlight clips using techniques described in connection with FIG. 6.

In various embodiments, process 700 comprises a step 710 to produce narrated highlights with audio based on the consistent narrations and the crowd background noise for the plurality of highlight clips. The audio for each highlight clip may be produced by performing text-to-speech on the narrations and overlaying the narration audio with crowd background noise. In various embodiments, each of the highlight clips and audio is stitched together, which may include adding visual and/or audio effects to allow for smooth transitions between clips.

A video stream for a live sporting event may have new highlight clips as the event progresses. For example, after a narrated highlight video is produced, it may be updated or augmented after a predefined duration of time has elapsed (e.g., every 5 minutes). This may be achieved by first determining additional video stream content of the event is available, determining additional transcribed commentary from the additional video stream content, obtaining additional metadata messages for the event, determining one or more additional highlight clips from the additional video stream content, and determining one or more additional narrated highlights from the one or more additional highlight clips. The additional narrated highlights may be appended to the end of a previously generated narrated highlight video, or may be used to update the narrated highlight video. For example, each highlight clip may have an associated relevance score and clips may be included in the narrated highlight video based on their relevance scores to fill a fixed amount of time (e.g., maximum length of 3-minutes for the video). As more highlight clips are collected, some of the previous clips may be removed from the highlight video due to subsequent clips having higher relevance scores.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 8:
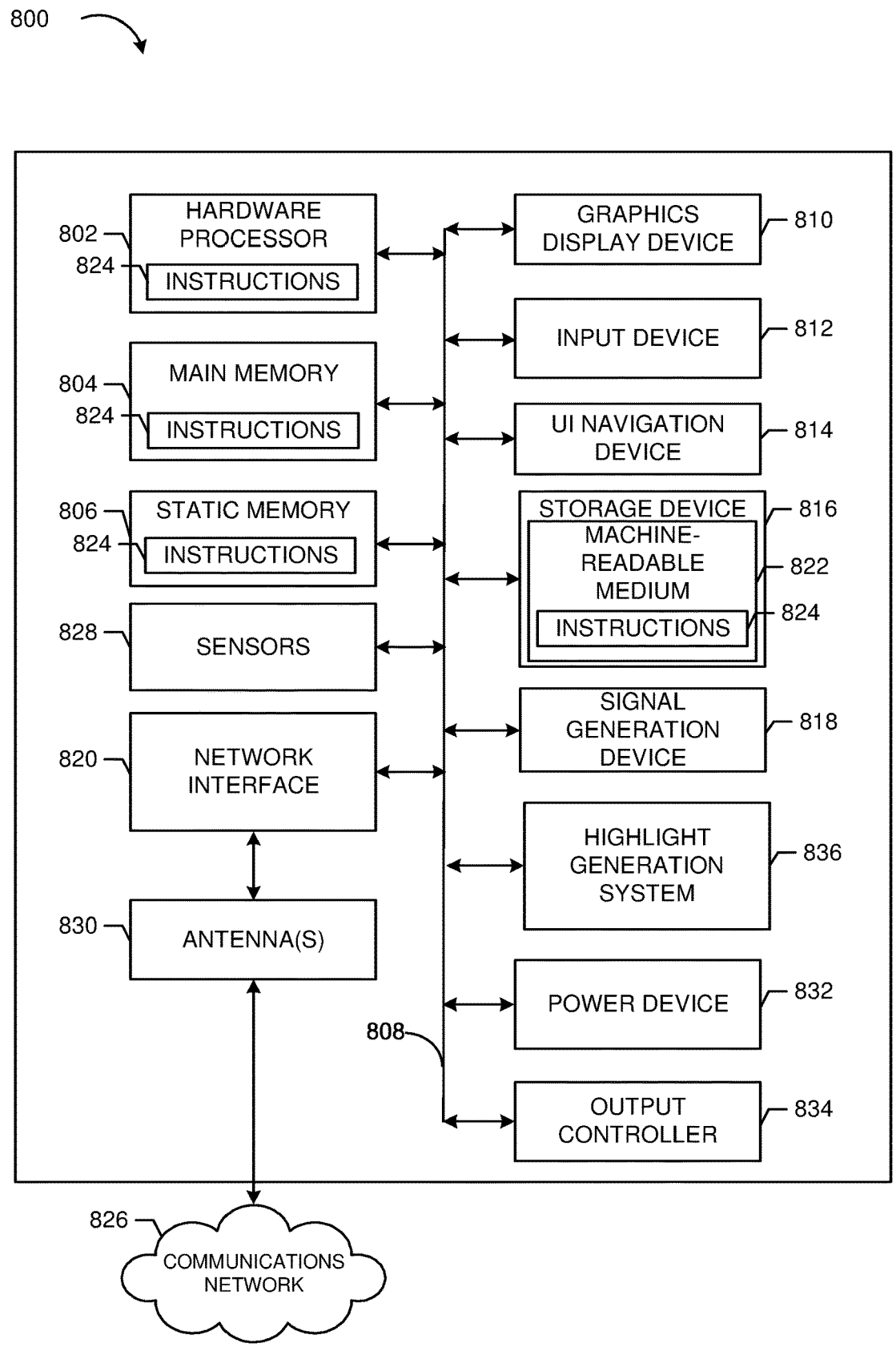
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

In various embodiments, highlight generation system 836 refers to hardware, software, or a combination thereof that implements various functionality related to producing highlights with narratives. In various embodiments, highlight generation system 836 coordinates or initiates the execution of the pipeline described in connection with FIG. 1. In various embodiments, techniques described in connection with FIGS. 1-7 for producing highlights with generative narrations is implemented at least in part using highlight generation system 836.

The storage device 816 may include a machine readable medium 822 on which is stored one or more sets of data structures or instructions 824 (e.g., software) embodying or utilizing any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and cause the machine 800 to perform any one or more of the techniques of the present disclosure, or is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device that incorporates a wireless communication device, a mobile or portable global positioning system (GPS) device, a device that incorporates a GPS receiver or transceiver or chip, a device that incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for the purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or are functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that may be used to store the information and may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
    determining a video stream of an event, wherein the video stream comprises a composite audio stream that includes audio commentary and background noise;
    determining, based at least in part on the video stream and using a speech transcription service, transcribed commentary of the audio commentary;
    obtaining a plurality of metadata messages for the event;
    determining, based at least in part on the video stream and using a clip selection system, a plurality of highlight clips; and
    determining narrated highlights for each of the plurality of highlight clips by at least:
        determining a first time window for a highlight clip of the plurality of highlight clips;
        determining one or more metadata messages from the plurality of metadata messages from the first time window;
        determining a portion of the transcribed commentary from a second time window that includes the first time window;
        determining a prompt based at least in part on the one or more metadata messages and the portion of the transcribed commentary;
        determining a generative narration based at least in part on the prompt and using a generative model;
        validating factual consistency of the generative narration based at least in part on the one or more metadata messages and the portion of the transcribed commentary;
        extracting the background noise for the highlight clip; and
        producing a narrated highlight by at least replacing audio of the highlight clip with the generative narration and the background noise.

2. The computer-implemented method of claim 1, wherein the prompt comprises:
    a context portion that is determined based at least in part on the one or more metadata messages;
    an information portion that is based at least in part on the portion of the transcribed commentary from the second time window; and
    an instruction to generate a text-based narrative.

3. The computer-implemented method of claim 1, wherein validating the factual consistency of the generative narration comprises:
  providing the generative narration, the one or more metadata messages, and the portion of the transcribed commentary to a Decoding-enhanced BERT with Disentangled Attention (DeBERTa) based model;
  determining a consistency score for the generative narration using the DeBERTa based model; and
  determining that the consistency score for the generative narration exceeds a threshold value.

4. The computer-implemented method of claim 1, wherein:
  the event is a live sporting event; and
  the method further comprises:
    determining a predefined duration of time has elapsed;
    determining additional video stream content of the event;
    determining additional transcribed commentary from the additional video stream content;
    obtaining additional metadata messages for the event;
    determining one or more additional highlight clips from the additional video stream content; and
    determining one or more additional narrated highlights from the one or more additional highlight clips.

5. A system, comprising:
  one or more processors; and
  memory storing executable instructions that, as a result of execution by the one or more processors, cause the system to:
    determine one or more metadata messages for a first portion of a video stream;
    determine transcribed commentary for a second portion of the video stream, wherein the second portion includes the first portion;
    determine a prompt based at least in part on the one or more metadata messages and the transcribed commentary;
    determine an output text based at least in part on the prompt and using a generative model;
    determine a consistency score for the output text that indicates whether the output text is factually consistent with the one or more metadata messages and the transcribed commentary; and
    contingent upon the consistency score indicating that the output text is factually consistent, generate audio for the output text.

6. The system of claim 5, wherein the executable instructions include further instructions that, as a result of execution by the one or more processors, further cause the system to:
  determine that the consistency score is below a threshold value;
  reject the output text;
  determine a second output text based at least in part on the prompt and using the generative model;
  determine a second consistency score for the second output text;
  determine the second consistency score exceeds the threshold value; and
  accept the second output text.

7. The system of claim 5, wherein the executable instructions include further instructions that, as a result of execution by the one or more processors, further cause the system to:
  determine background noise for the first portion of the video stream;
  determine audio from the output text; and
  determine a narrated highlight with the background noise and the audio from the output text.

8. The system of claim 5, wherein
  the first portion of the video stream corresponds to a first time window; and
  the second portion of the video stream corresponds to a second time window, wherein the second time window comprises:
    the first time window;
    a first shoulder region prior to the first time window; and
    a second shoulder region subsequent to the first time window.

9. The system of claim 5, wherein the prompt comprises:
  a context portion that is determined based at least in part on the one or more metadata messages;
  an information portion that is based at least in part on the portion of the transcribed commentary; and
  an instruction to generate a text-based narrative.

10. The system of claim 9, wherein the prompt further comprises one or more constraints on length of the text-based narrative.

11. The system of claim 5, wherein the consistency score is determined based at least in part on a Decoding-enhanced BERT with Disentangled Attention (DeBERTa) based model.

12. The system of claim 5, wherein the generative model is a large language model (LLM).

13. A non-transitory computer-readable storage medium storing executable instructions that, as a result of being executed by one or more processors of a computer system, cause the computer system to at least:
  determine one or more metadata messages for a first portion of a video stream;
  determine transcribed commentary for a second portion of the video stream, wherein the second portion includes the first portion;
  determine a prompt based at least in part on the one or more metadata messages and the transcribed commentary;
  determine an output text based at least in part on the prompt and using a generative model;
  determine a consistency score for the output text that indicates whether the output text is factually consistent with the one or more metadata messages and the transcribed commentary; and
  contingent upon the consistency score indicating that the output text is factually consistent, generate audio for the output text.

14. The non-transitory computer-readable storage medium of claim 13, wherein the instructions, as a result of being executed by the one or more processors of the computer system, further cause the computer system to:
  determine that the consistency score is below a threshold value;
  reject the output text;
  determine a second output text based at least in part on the prompt and using the generative model;
  determine a second consistency score for the second output text;
  determine the second consistency score exceeds the threshold value; and
  accept the second output text.

15. The non-transitory computer-readable storage medium of claim 13, wherein the instructions, as a result of being executed by the one or more processors of the computer system, further cause the computer system to:
  determine background noise for the first portion of the video stream;
  determine audio from the output text; and
  determine a narrated highlight with the background noise and the audio from the output text.

16. The non-transitory computer-readable storage medium of claim 13, wherein:

the first portion of the video stream corresponds to a first time window; and
the second portion of the video stream corresponds to a second time window, wherein the second time window comprises:
the first time window;
a first shoulder region prior to the first time window; and
a second shoulder region subsequent to the first time window.

17. The non-transitory computer-readable storage medium of claim 13, wherein the prompt comprises:
a context portion that is determined based at least in part on the one or more metadata messages;
an information portion that is based at least in part on the portion of the transcribed commentary; and
an instruction to generate a text-based narrative.

18. The non-transitory computer-readable storage medium of claim 17, wherein the prompt further comprises one or more constraints on length of the text-based narrative.

19. The non-transitory computer-readable storage medium of claim 13, wherein the consistency score is determined based at least in part on a Decoding-enhanced BERT with Disentangled Attention (DeBERTa) based model.

20. The non-transitory computer-readable storage medium of claim 13, wherein the generative model is a large language model (LLM).

\* \* \* \* \*